J. W. Norcross,
Tackle Hook,
No. 47,322. Patented Apr. 18, 1865.

Witnesses
W. Dean Overall
Theo Tusch

Inventor
J. W. Norcross
per Munn & Co
Attorney

UNITED STATES PATENT OFFICE.

JOSEPH W. NORCROSS, OF MIDDLETOWN, CONNECTICUT.

IMPROVED TACKLE-HOOK.

Specification forming part of Letters Patent No. 47,312, dated April 18, 1865.

*To all whom it may concern:*

Be it known that I, Captain JOSEPH W. NORCROSS, of Middletown, in the county of Middlesex and State of Connecticut, have invented a new and Improved Tackle-Hook; and I do hereby declare that the following is a full, clear, and exact description thereof, which will enable others skilled in the art to make and use the same, reference being had to the accompanying drawings, forming part of this specification, in which—

Figure 1:
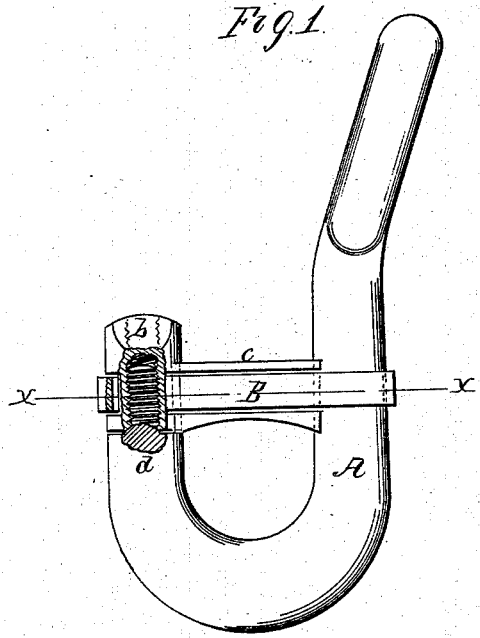
Figure 2:
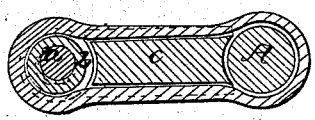

Figure 1 represents a sectional elevation of this invention. Fig. 2 is a transverse section of the same, the plane of section being indicated by the line $x\ x$, Fig. 1, and looking in the direction of the arrow opposite to that line.

Similar letters of reference indicate like parts.

The object of this invention is to overcome two of the principal difficulties experienced in the use of the common hook—viz., the straightening of the hook and the spontaneous unhooking of the same.

The invention consists in the use of a metal band around the neck of the hook in combination with a screw which secures it to the end of the hook in such a manner that the lower part of the hook is converted into an eye and the spontaneous unhooking of the same is rendered impossible; and, furthermore, by the metal band the hook is enabled to sustain a heavy strain, for said hook cannot be bent until the band parts.

A represents a hook shaped much the same as an ordinary hook, and provided with a metal band, B, which is applied to it just below its neck, and passes around the point $a$ of the hook, as clearly shown in the drawings. The point of the hook terminates with a short screw, on which is placed a cylindrical nut, $b$, with a circular recess to receive the band. Between this nut and the eye of the hook is placed a piece of metal, $c$, to fill the space, so as to close up entirely the open part of the hook. By this arrangement the lower part of the hook is converted into an eye, and it is evident that by the application of the metal band B the hook is enabled to sustain a much heavier strain than it would without said band, for the hook cannot bend or straighten until the band parts, and, forthermore, the hook cannot unhook spontaneously unless the nut is unscrewed.

It is obvious that in this arrangement the order of the screw can be reversed by making the hole for the nut in the end of the hook and the screw to take the place of the nut, or the link or band might be kept in place by a spring-catch, and the nut or screw dispensed with altogether; but in practice a positive fastening—such as a nut or screw—is preferable.

I claim as new and desire to secure by Letters Patent—

The band B, passing around the neck and point of the hook and secured to the latter in the manner herein set forth.

JOSEPH W. NORCROSS.

Witnesses:
M. M. LIVINGSTON,
J. P. HALL.